(12) United States Patent
Robertson

(10) Patent No.: US 10,112,509 B1
(45) Date of Patent: Oct. 30, 2018

(54) CHILD VEHICLE CAPSULE

(71) Applicant: Mary Robertson, Grand Prairie, TX (US)

(72) Inventor: Mary Robertson, Grand Prairie, TX (US)

(*) Notice: Subject to any disclaimer, the term of this patent is extended or adjusted under 35 U.S.C. 154(b) by 219 days.

(21) Appl. No.: 15/201,801

(22) Filed: Jul. 5, 2016

(51) Int. Cl.
    *B60N 2/28* (2006.01)
    *B60N 2/427* (2006.01)
    *B60N 2/56* (2006.01)

(52) U.S. Cl.
    CPC ......... *B60N 2/2884* (2013.01); *B60N 2/2839* (2013.01); *B60N 2/2872* (2013.01); *B60N 2/2881* (2013.01); *B60N 2/4279* (2013.01); *B60N 2/42709* (2013.01); *B60N 2/5635* (2013.01); *B60N 2/5678* (2013.01)

(58) Field of Classification Search
    CPC .................................................. B60N 2/2884
    See application file for complete search history.

(56) References Cited

U.S. PATENT DOCUMENTS

| | | | | |
|---|---|---|---|---|
| 4,379,856 A | * | 4/1983 | Samaritter | B29C 44/0461 264/45.1 |
| 4,500,135 A | * | 2/1985 | Kincheloe | B60N 2/286 280/751 |
| 4,522,447 A | * | 6/1985 | Snyder | A47C 7/022 297/452.27 |
| 4,579,385 A | * | 4/1986 | Koenig | B60N 2/28 297/184.12 |
| 4,627,659 A | | 12/1986 | Hall | |
| D295,276 S | * | 4/1988 | Brown | D12/128 |
| 4,790,593 A | | 12/1988 | Davalos | |
| 4,837,881 A | * | 6/1989 | Kondo | A47C 7/18 297/452.27 |
| D335,965 S | | 6/1993 | Spring | |
| 5,232,263 A | * | 8/1993 | D'Ull | B60N 2/26 297/184.12 |
| 5,544,942 A | * | 8/1996 | Vu Khac | A47C 7/18 297/452.27 |
| 5,556,162 A | * | 9/1996 | Raffini | A47D 15/00 297/216.11 |
| 5,662,379 A | * | 9/1997 | Zimelman | B60N 2/2839 297/216.11 |

(Continued)

FOREIGN PATENT DOCUMENTS

WO     2007070429 A2     6/2007

*Primary Examiner* — Rodney B White
*Assistant Examiner* — Tania Abraham
(74) *Attorney, Agent, or Firm* — Kyle A. Fletcher, Esq.

(57) ABSTRACT

The child vehicle capsule is a device that protects infants from impact injuries during unfortunate events. The child vehicle capsule comprises a shell, an impact layer, a comfort layer, and a ventilation system. The shell is an impact resistant enclosure that is absorb the impact energy. The impact layer is a structure that absorbs impact energy by permanently deforming during an unfortunate event. The comfort layer is a viscoelastic structure that: 1) absorbs a portion of the impact energy; 2) that reduces damage caused by the impact force by distributing the impact energy over a time period greater than the initial impact; and 3) that returns to its relaxed shape once the impact forces have been dissipated. The ventilation system manages airflow through the child vehicle capsule to maintain the comfort of the infant.

15 Claims, 6 Drawing Sheets

(56) References Cited

U.S. PATENT DOCUMENTS

| | | | | |
|---|---|---|---|---|
| 5,716,095 | A * | 2/1998 | Lopez | B60N 2/2839 |
| | | | | 297/184.13 |
| 5,765,893 | A * | 6/1998 | Ziegler | B60N 2/286 |
| | | | | 297/256.15 |
| 5,806,924 | A * | 9/1998 | Gonas | B60N 2/2821 |
| | | | | 160/37 |
| 6,058,529 | A * | 5/2000 | Goysich | A47D 13/02 |
| | | | | 297/216.11 |
| 6,079,781 | A | 6/2000 | Tilley | |
| 6,439,660 | B1 | 8/2002 | Guenther | |
| 6,702,374 | B2 * | 3/2004 | Kams | A47D 13/02 |
| | | | | 135/93 |
| 7,661,764 | B2 * | 2/2010 | Ali | B68G 7/05 |
| | | | | 297/452.26 |
| 7,748,781 | B2 | 7/2010 | Bass | |
| 8,011,727 | B1 * | 9/2011 | Martinez | B60N 2/2881 |
| | | | | 297/180.11 |
| 8,777,311 | B1 * | 7/2014 | Laurel, Jr. | A47D 1/00 |
| | | | | 297/217.3 |
| 8,893,327 | B1 * | 11/2014 | Muhammad | A47D 9/00 |
| | | | | 5/101 |
| 8,931,839 | B1 | 1/2015 | Laurel, Jr. | |
| 8,960,789 | B2 * | 2/2015 | McCormick | B60N 2/427 |
| | | | | 297/216.11 |
| 2006/0267386 | A1 * | 11/2006 | Nakhla | B29C 44/1271 |
| | | | | 297/250.1 |
| 2006/0273650 | A1 * | 12/2006 | Embach | A47C 7/18 |
| | | | | 297/452.27 |
| 2009/0091166 | A1 * | 4/2009 | Jha | B60N 2/2821 |
| | | | | 297/250.1 |
| 2012/0231203 | A1 * | 9/2012 | Galbreath | B60N 2/70 |
| | | | | 428/68 |
| 2012/0292964 | A1 * | 11/2012 | Heidt | B62J 1/16 |
| | | | | 297/256.15 |

* cited by examiner

CHILD VEHICLE CAPSULE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of passenger vehicles, more specifically, a safety seat adapted for use in a passenger vehicle.

SUMMARY OF INVENTION

The child vehicle capsule is a safety device adapted for use with infants. The child vehicle capsule is further adapted for use with a vehicle. The child vehicle capsule is a capsule within which the infant is placed during travel in a vehicle. The child vehicle capsule is designed to protect the infant from injury due to impacts during unfortunate events. The child vehicle capsule comprises a shell, an impact layer, a comfort layer, and a ventilation system. The shell is an impact resistant enclosure that is designed to absorb the bulk of the impact energy that the child vehicle capsule is subjected to. The impact layer is a closed cell foam structure that is molded to fit along the inner surface of the shell. The impact layer is a stiff structure that is designed to absorb impact energy by permanently deforming during the unfortunate event. The comfort layer is a viscoelastic structure that: 1) absorbs a portion of the impact energy; 2) that reduces damage caused by the impact force by distributing the impact energy over a time period greater than the initial impact; and 3) that returns to its relaxed shape once the impact forces have been dissipated. The ventilation system manages airflow through the child vehicle capsule to maintain the comfort of the infant.

These together with additional objects, features and advantages of the child vehicle capsule will be readily apparent to those of ordinary skill in the art upon reading the following detailed description of the presently preferred, but nonetheless illustrative, embodiments when taken in conjunction with the accompanying drawings.

In this respect, before explaining the current embodiments of the child vehicle capsule in detail, it is to be understood that the child vehicle capsule is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child vehicle capsule.

It is therefore important that the claims be regarded as including such equivalent construction insofar as they do not depart from the spirit and scope of the child vehicle capsule.

It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
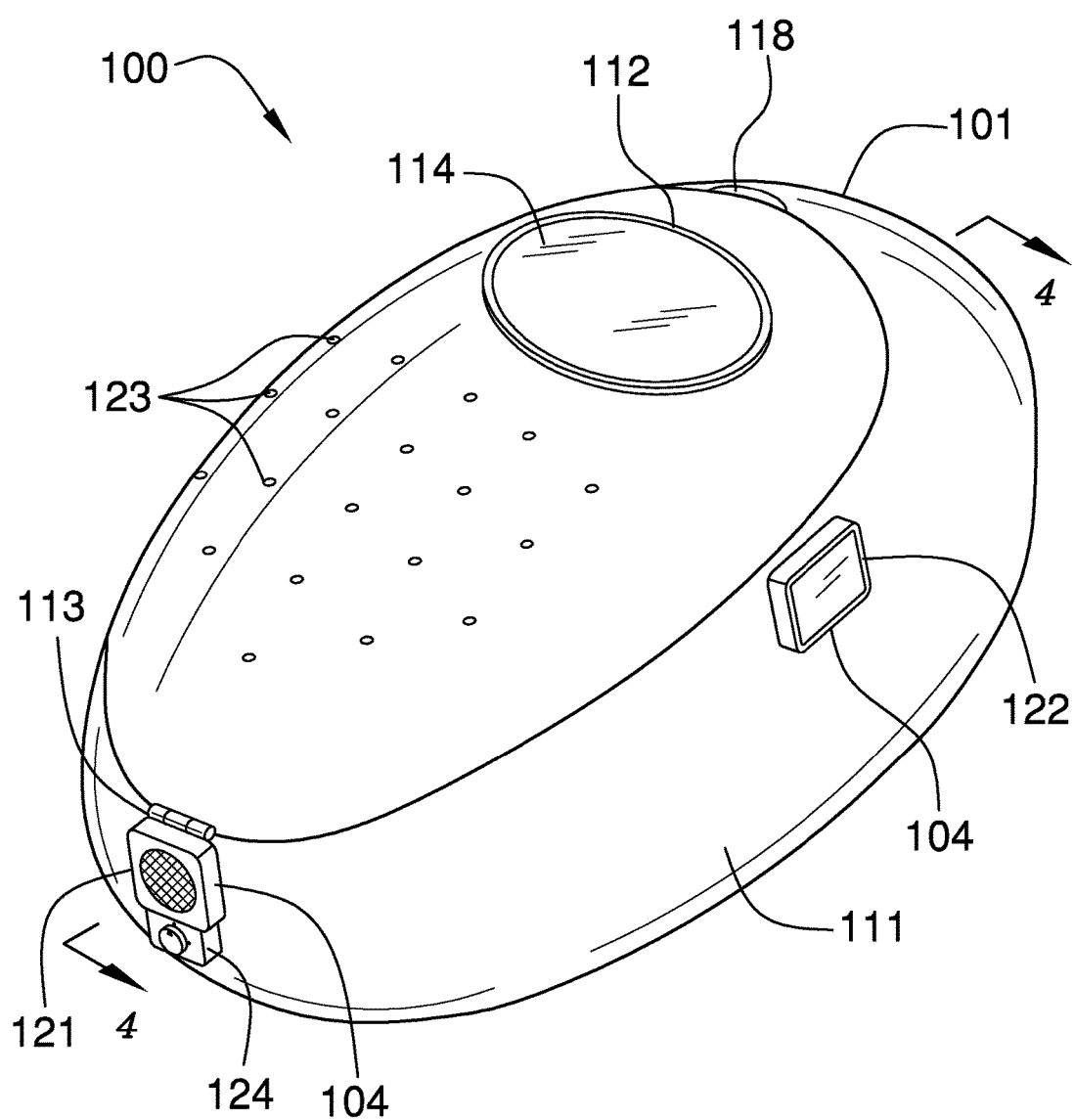
FIG. 1 is a front perspective view of an embodiment of the disclosure.
Figure 2:
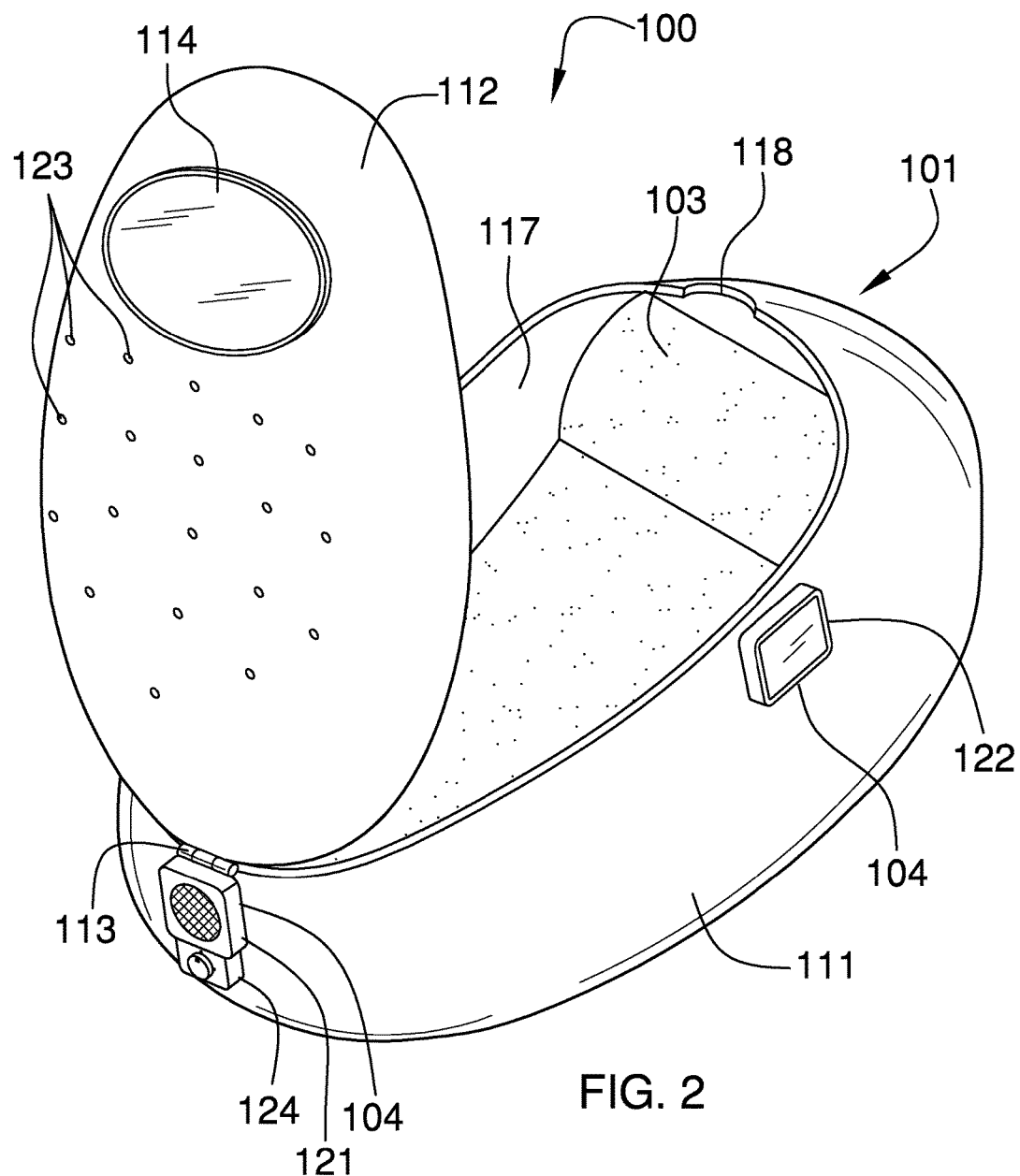
FIG. 2 is a rear perspective view of an embodiment of the disclosure.
Figure 3:
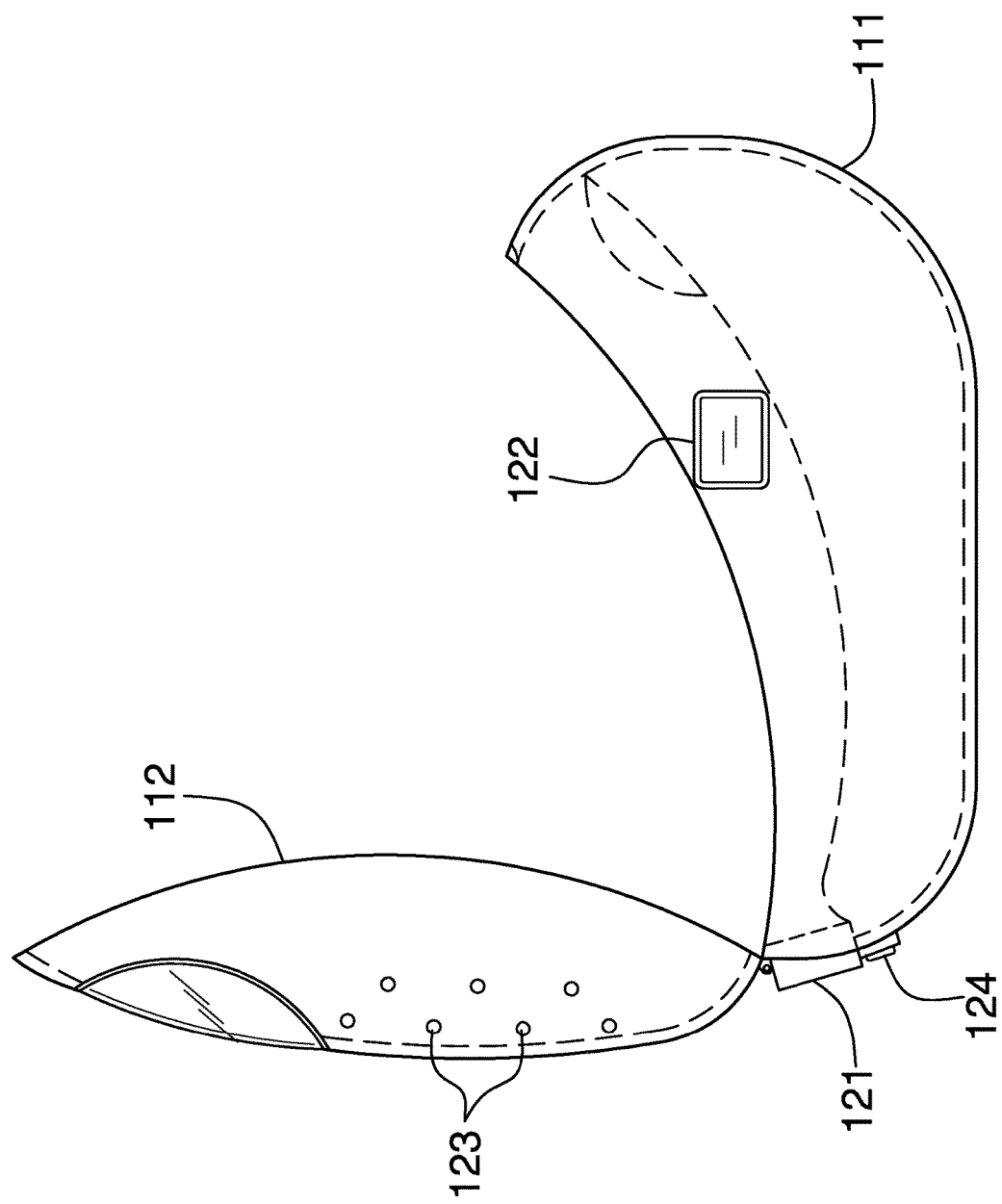
FIG. 3 is a side view of an embodiment of the disclosure.
Figure 4:
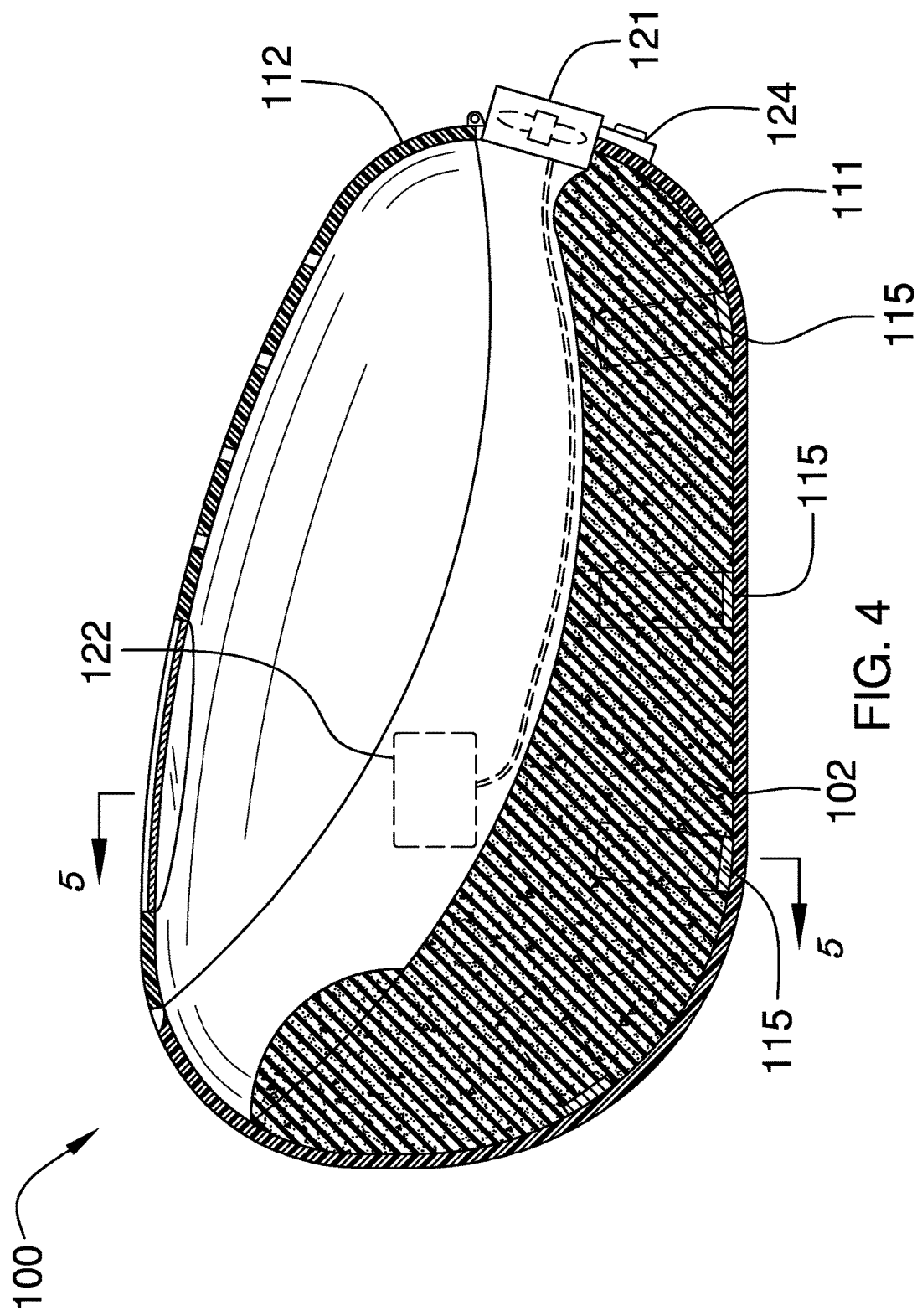
FIG. 4 is a cross-sectional view of an embodiment of the disclosure across 4-4 as shown in FIG. 1.
Figure 5:
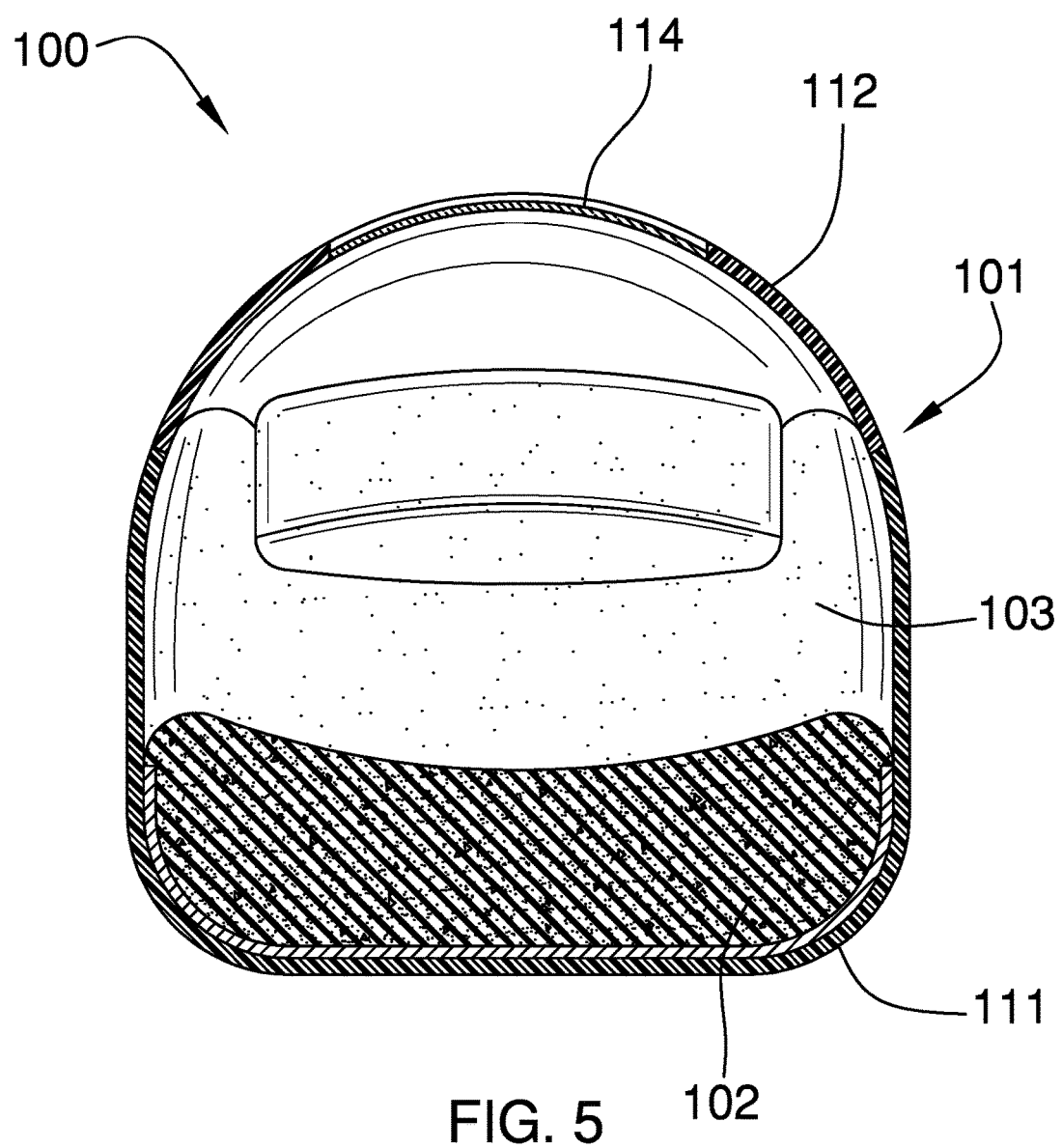
FIG. 5 is a cross-sectional view of an embodiment of the disclosure across 5-5 as shown in FIG. 4.
Figure 6:
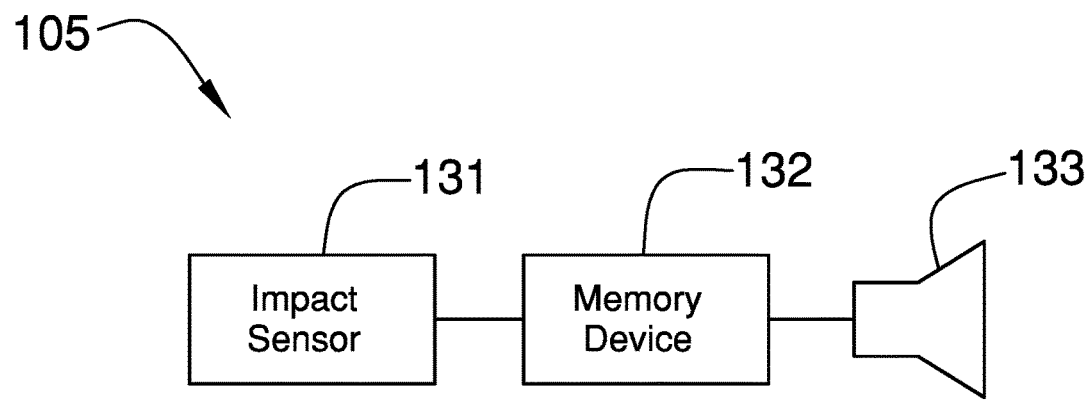
FIG. 6 is a detail view of an embodiment of the disclosure.
Figure 7:
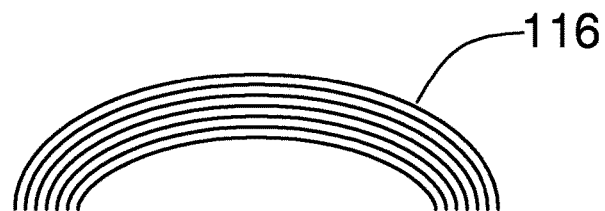
FIG. 7 is a detail view of an embodiment of the disclosure.

Detailed reference will now be made to one or more potential embodiments of the disclosure, which are illustrated in FIGS. 1 through 7.

The child vehicle capsule 100 (hereinafter invention) comprises a shell 101, an impact layer 102, a comfort layer 103, and a ventilation system 104. The invention 100 is a safety device adapted for use with infants. The invention 100 is further adapted for use with a vehicle. The invention 100 is a capsule within which the infant is placed during travel in a vehicle. The invention 100 is designed to protect the infant from injury due to impacts during unfortunate events. The invention 100 comprises a shell 101, an impact layer 102, a comfort layer 103, and a ventilation system 104. The shell 101 is an impact resistant enclosure that is designed to absorb the bulk of impact energy that the invention 100 is subjected to. The impact layer 102 is a closed cell foam structure that is molded to fit along the inner surface of the shell 101. The impact layer 102 is a stiff structure that is designed to absorb impact energy by permanently deforming during the unfortunate event. The comfort layer 103 is a viscoelastic structure that: 1) absorbs a portion of the impact energy; 2) that reduces damage caused by the impact force by distributing the impact energy over a time period greater than the initial impact; and 3) that returns to its relaxed shape once the impact forces have been dissipated.

The shell 101 is a rigid case that contains the impact layer 102, the comfort layer 103 and the infant during transport. The shell 101 is formed in the shape of an ellipsoid. The shell 101 comprises a base 111, a lid 112, a hinge 113, a window 114, and a plurality of ribs 115. The base 111 and the lid 112 form the structure of the ellipsoid. As shown most clearly in FIGS. 1 and 2, the base 111 is formed with an aperture 117 through which the infant is placed and removed from the base 111. The lid 112 is a close fitting closure that is used to enclose the base 111 after the infant has been loaded into the shell 101. The lid 112 is attached to the base 111 using a hinge 113. The lid 112 is secured to the base 111 using a latching mechanism 118. Latching mechanisms 118 appropriate for this application are well known and documented within the mechanical arts. Each of the plurality of ribs 115 is a structural band that is added to the interior surface of the shell 101 in order to strengthen the shell 101. The base 111 and the lid 112 are formed with a laminated polycarbonate 116.

The method of laminating polycarbonate 116 for the base 111 and the lid 112 is similar to the manufacture of what is commonly referred to as bulletproof glass. In the first potential embodiment of the disclosure, the lid 112 is formed with a window 114 that provides a transparent viewing port to allow the infant to be checked on at regular intervals. The base 111 and the lid 112 are further formed with a plurality of ventilation holes 123 that allow for the flow of air into and out of the shell 101. The plurality of ventilation holes 123 is discussed in more detail elsewhere in this disclosure.

The impact layer 102 is a closed cell foam structure that is used to line the interior surface of the shell 101. The impact layer 102 is a structure that absorbs the energy of an impact that was not absorbed by the shell 101 by permanently deforming, breaking, or crumbling. Suitable materials for use in the closed cell foam structure include, but are not limited to expanded polystyrene foams or expanded polypropylene foams. The use of closed cell foams in personal protective equipment, including but not limited to bicycle helmets, are well known and documented.

The comfort layer 103 is a layer of a viscoelastic material that lines the interior surface of the impact layer 102. The viscosity and elasticity of the viscoelastic material of the comfort layer 103 absorbs the energy of an impact that was not absorbed by the impact layer 102 by deforming and by distributing the energy over a period of time that is greater than the period the impact occurred in. Suitable materials for use as the comfort layer 103 includes a 6.5% to 10% (m/m) water solution of gelatin with a bloom measure of greater than 200 (commonly referred to a ballistic gel) or a polyurethane foam (commonly referred to as memory foam).

The ventilation system 104 comprises a fan 121, a thermostat 122, a plurality of ventilation holes 123, and a fan override 124. The fan 121 is attached to the shell 101 such that the fan 121 will draw air into the shell 101 through the plurality of ventilation holes 123. The plurality of ventilation holes 123 are holes formed in the base 111 and the lid 112 through which air is drawn into and expelled from the shell 101 when the shell 101 is enclosed. The thermostat 122 is a commercially available thermostat 122 that is mounted on the exterior of the shell 101. The thermostat 122 measures the temperature within the shell 101 and will turn the fan 121 on and off based on the measured temperature within the shell 101. The fan override 124 is a switch that can be used to manually override the thermostat 122 to turn the fan 121 on and off.

The invention 100 can optionally include a comfort system 105. The comfort system 105 comprises an impact sensor 131, a memory device 132, and a speaker 133. The memory device 132 is a commercially available device that electronically stores and retrieves audio messages. The speaker 133 is a transducer that receives electrical signals from the memory device 132 and converts the electrical signals into audible sounds. The impact sensor 131 is a commercially available sensor that initiates the memory device 132 retrieving of the audio message and sending the audio message in the form of the electrical signals sent to the speaker 133. The intent of the comfort system 105 is to play a soothing sound for the infant should the impact of an unfortunate event be detected.

The following definitions were used in this disclosure:

Elastic: As used in this disclosure, an elastic is a material or object that deforms when a force is applied to it and that is able to return to its original shape after the force is removed. A material that exhibits these qualities is also referred to as an elastomeric material.

Ellipsoid: As used in this disclosure, an ellipsoid is a three dimensional geometric surface through which all planar surfaces from either circles or ellipses. An ellipsoid is a type of quadric surface.

Fan: As used in this disclosure, a fan is a mechanical device with rotating blades that is used to create a flow or current of air.

Foam: As used in this disclosure, foam is a mass of gas filled spaces, commonly referred to as bubbles, which can be formed: 1) on or in a liquid or gel; or, 2) in a solid material.

Fluid: As used in this disclosure, a fluid refers to a state of matter wherein the matter is capable of flow and takes the shape of a container it is placed within. The term fluid commonly refers to a liquid.

Gel: As used in this disclosure, a gel is a substance comprising mostly of liquid (by mass) that is trapped in a cross-linked network of proteins and peptides that exhibits the properties of a solid.

Personal Protective Equipment: As used in this disclosure, personal protective equipment refers to the use of protective garments or protective equipment that is designed to protect the wearer's body from injury. Personal protective equipment may be designed for occupational protection, including, but not limited to, equipment to protect military, police, or firefighting personnel, or may be designed to provide protection in sports or recreational activities, including, but not limited to, equipment to protect participants in football, hockey, or soccer activities.

Quadric Surface: As used in this disclosure, a quadric surface is a three dimensional surface that varies in the three Cartesian coordinates in an algebraically defined manner that is related to conic sections. Euclidian planes as well as the surfaces of ellipsoids, spheres, paraboloids, and cones are examples of quadric surfaces. The Euclidian plane is technically considered a degenerate form of a quadric surface and, unless specifically stated otherwise within this disclosure, is explicitly excluded from this definition.

Relaxed Shape: As used in this disclosure, a structure is considered to be in its relaxed state when no shear, strain, or torsional forces are being applied to the structure.

Speaker: As used in this disclosure, a speaker is an electrical device that converts an electrical signal into an audible sound.

Transducer: As used in this disclosure, a transducer is a device that converts a physical quantity, such as pressure or brightness into an electrical signal or a device that converts an electrical signal into a physical quantity.

Unfortunate Event: As used in this disclosure, an unfortunate event is an incident that: 1) happens unexpectedly; 2) happens unintentionally; and, 3) has the potential to cause injury and or property damage.

Viscosity: As used in this disclosure, viscosity refers to the resistance of an elastic material to deformation. Higher viscosity would refer to a greater resistance to deformation.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A safety seat comprising:
a shell, an impact layer, a comfort layer, and a ventilation system;
wherein the safety seat is adapted for use with a vehicle;
wherein the safety seat is designed to protect an occupant from impact injury;
wherein the shell is a rigid case that contains the impact layer, the comfort layer and the ventilation system;
wherein the shell comprises a base, a lid, a hinge, a window, a plurality of ribs, and a latching mechanism;
wherein the lid is attached to the base using the hinge;
wherein the lid is secured to the base using the latching mechanism;
wherein the window is formed in the lid;
wherein the plurality of ribs are attached to the base;
wherein each of the plurality of ribs is a structural band that is added to the interior surface of the base;
wherein the window provides a transparent viewing port into the shell;
wherein the impact layer lines the interior surface of the shell;
wherein the impact layer absorbs the energy of an impact by permanently deforming.

2. The safety seat according to claim 1
wherein the base is formed with an aperture;
wherein the lid is a closure that encloses the base.

3. The safety seat according to claim 1 wherein the impact layer is a closed cell foam structure.

4. The safety seat according to claim 1
wherein the comfort layer is a viscoelastic material;
wherein the viscoelastic material absorbs impact energy;
wherein the viscoelastic material distributes the impact energy over a time period greater than the initial impact;
wherein the viscoelastic material returns to its relaxed shape once the impact forces have been dissipated.

5. The safety seat according to claim 4
wherein the ventilation system comprises a fan, a thermostat, a plurality of ventilation holes, and a fan override;
wherein the fan is attached to the shell such that the fan will draw air into the shell through the plurality of ventilation holes;
wherein the plurality of ventilation holes are holes formed in the base and lid;
wherein the thermostat is mounted on the exterior of the shell;
wherein the fan override is mounted on the exterior of the shell.

6. The safety seat according to claim 5 wherein the thermostat measures the temperature within the shell and turns the fan on and off based on the measured temperature within the shell.

7. The safety seat according to claim 6 wherein the fan override is a switch that can be used to manually turn the fan on and off.

8. The safety seat according to claim 7
wherein the base is formed from laminated polycarbonate;
wherein the lid is formed from laminated polycarbonate.

9. The safety seat according to claim 8 wherein the impact layer is formed from a material selected from the group consisting of an expanded polystyrene foam or an expanded polypropylene foam.

10. The safety seat according to claim 9 wherein the comfort layer is a polyurethane foam.

11. The safety seat according to claim 10 wherein the shell is formed in the shape of an ellipsoid.

12. The safety seat according to claim 11
wherein the safety seat further comprises an impact sensor, a memory device, and a speaker;
wherein the memory device electronically stores and retrieves audio messages;
wherein the speaker is a transducer that receives electrical signals from the memory device and converts the electrical signals into audible sounds.

13. The safety seat according to claim 9
wherein the comfort layer comprises a gelatin;
wherein the bloom measure of the gelatin is greater than 200;
wherein the solution concentration of gelatin in water is between 5% and 15% (m/m).

14. The safety seat according to claim 13 wherein the shell is formed in the shape of an ellipsoid.

15. The safety seat according to claim 14
wherein the safety seat further comprises an impact sensor, a memory device, and a speaker;
wherein the memory device electronically stores and retrieves audio messages;
wherein the speaker is a transducer that receives electrical signals from the memory device and converts the electrical signals into audible sounds.

* * * * *